(12) United States Patent
Graffis

(10) Patent No.: US 8,757,639 B2
(45) Date of Patent: Jun. 24, 2014

(54) MULTI-FUNCTIONAL HUNTER'S ACCESSORY

(76) Inventor: Randall Lee Graffis, Carmel, IN (US)

(*) Notice: Subject to any disclaimer, the term of this patent is extended or adjusted under 35 U.S.C. 154(b) by 0 days.

(21) Appl. No.: 13/506,359

(22) Filed: Apr. 13, 2012

(65) Prior Publication Data

US 2013/0270784 A1 Oct. 17, 2013

(51) Int. Cl.
*B62B 1/04* (2006.01)
(52) U.S. Cl.
USPC .............................................. 280/30; 280/638
(58) Field of Classification Search
USPC ............... 280/7.1, 7.17, 30, 35, 37, 47.131, 280/47.17, 47.18, 47.19, 47.24, 47.26, 280/47.315, 638, 639, 651, 652, 653, 656, 280/659
See application file for complete search history.

(56) References Cited

U.S. PATENT DOCUMENTS

| | | | | |
|---|---|---|---|---|
| 1,479,351 A | * | 1/1924 | Winterbottom | 280/47.32 |
| 2,907,601 A | * | 10/1959 | Kuchenbecker et al. | 296/168 |
| 3,055,674 A | * | 9/1962 | Karwatt et al. | 280/47.131 |
| 3,675,940 A | * | 7/1972 | Crookston | 280/47.26 |
| 3,907,323 A | * | 9/1975 | Knapp et al. | 280/47.3 |
| 4,052,080 A | * | 10/1977 | Hedderich et al. | 280/47.26 |
| 4,408,774 A | * | 10/1983 | Raskob | 280/47.26 |
| 4,438,940 A | * | 3/1984 | Hunt | 280/19.1 |
| D293,309 S | * | 12/1987 | Robertson et al. | D12/6 |
| 4,789,180 A | * | 12/1988 | Bell | 280/652 |
| 4,796,789 A | * | 1/1989 | Willcocks | 224/581 |
| 5,419,569 A | * | 5/1995 | Walla | 280/47.27 |
| 5,513,231 A | * | 4/1996 | Jones et al. | 376/261 |
| 5,810,374 A | * | 9/1998 | Small | 280/47.24 |
| 5,842,595 A | * | 12/1998 | Williams | 220/495.11 |
| 6,386,557 B1 | * | 5/2002 | Weldon | 280/30 |
| 6,651,992 B1 | * | 11/2003 | Smith, Sr. | 280/47.26 |
| 6,659,477 B2 | * | 12/2003 | Jung | 280/47.26 |
| 6,742,789 B1 | * | 6/2004 | Nowak | 280/47.26 |
| 7,407,177 B2 | * | 8/2008 | Darling, III | 280/640 |
| 7,438,300 B1 | * | 10/2008 | Zien et al. | 280/79.5 |
| 7,726,670 B2 | * | 6/2010 | Manus | 280/47.24 |
| 7,959,182 B2 | * | 6/2011 | Klein | 280/652 |
| 2003/0102643 A1 | * | 6/2003 | Jung | 280/47.26 |
| 2005/0040613 A1 | * | 2/2005 | Williams et al. | 280/30 |
| 2006/0120277 A1 | * | 6/2006 | Katz | 370/216 |
| 2007/0029761 A1 | * | 2/2007 | Darling, III | 280/640 |
| 2007/0169994 A1 | * | 7/2007 | Oftedahl | 182/116 |
| 2008/0078683 A1 | * | 4/2008 | Kim | 206/315.7 |
| 2008/0174078 A1 | * | 7/2008 | Dooley | 280/1.5 |
| 2009/0160147 A1 | * | 6/2009 | Arthur | 280/35 |
| 2009/0189361 A1 | * | 7/2009 | Reed | 280/30 |
| 2011/0115175 A1 | * | 5/2011 | Jenkins | 280/30 |
| 2012/0181772 A1 | * | 7/2012 | Gokkel | 280/261 |
| 2012/0292866 A1 | * | 11/2012 | Jenkins | 280/30 |
| 2013/0015629 A1 | * | 1/2013 | Bengtzen | 280/30 |
| 2013/0127128 A1 | * | 5/2013 | Meidl | 280/47.17 |

* cited by examiner

*Primary Examiner* — Katy M Ebner
*Assistant Examiner* — Brodie Follman

(57) ABSTRACT

A multi-functional lightweight hunting accessory that provides a chair with adjustable back rest, storage for hunting gear and a platform for use as a commode. The chair transforms to become a game cart for transporting a game carcass across various terrain. The cart utilizes the half pipes of the chair base to create a trough which cradles a game carcass between its sides in an inverted position. Two wheels and an axle, which store in the container, assemble through the axle housing. A handle and handle extension stored in the axle housing combine to provide the hunter's towing point. A compact design utilizing a broad handle, low center of gravity and few parts produces a light weight and easily maneuverable game cart.

3 Claims, 12 Drawing Sheets

MULTI-FUNCTIONAL HUNTER'S ACCESSORY

FIELD OF THE INVENTION

The invention is in the field of multi-functional hunting equipment that transforms into a seat, pack and commode to a game cart for transporting heavy game from a kill area to a vehicle area.

BACKGROUND OF THE INVENTION

Hunting wild game involves a great deal of time in the out of doors. Transporting gear to the hunting area, finding a comfortable place to sit or answer the call of nature is always a challenge. When a large game animal is killed, after field dressing, the hunter must drag the animal back to a vehicle or preferably go back to retrieve a game cart. The first option requires a great deal of effort while the second requires twice the time he may not have due to nightfall. Reacquiring (finding) the carcass, left while retrieving a game cart, is also very problematic in many areas.

The game carts commercially available today, from retailers such as Cabela's, are single purpose devices normally left in a person's vehicle until needed long distances away. The carts are relatively large and not easily moved to the kill site.

What is desired, therefore, is a compact, lightweight, multi-functional device that will be initially carried, backpacked or wheeled into the hunting area. It would then provide any of its functions as circumstances dictate.

SUMMARY OF THE INVENTION

The present invention is a multi-functional hunter's accessory designed for containing and moving gear into a hunt site. Upon arrival it provides a comfortable chair and a place for biologic emptying. Its transformation into a game cart takes place when the hunter creates a trough on wheels that is suitable for moving a large game carcass from kill site to vehicle. The chair-pack-commode functions would be useful for non hunting activities.

Advantages of the invention stem from its compact size and light weight. It is easily stored in the trunk of a car or the back seat. From there it moves to the hunt area with little effort by either carrying, backpacking or wheeling. Its wide dual pneumatic wheels and low center of gravity make it easy to maneuver and control in rugged or swampy terrain.

A chair in accordance with the present invention is composed of half pipes (semi-circular cross sections) of rolled metal which when assembled as a cylinder with end caps form a container. The top cap serves as the seat while the bottom cap contains the gear stored inside. A second seat with hole and hinged along it's diameter, acts as a toilet seat when necessary and folds to fit within the container. A strap with ratchet wheel secures the half pipes that form the cylinder as well as secures the handle and handle extensions in their storage position in the axle housing. Thereafter, it is used to secure the game carcass within the cart for transport.

Embodiment I uses three half pipes of which the base half pipe has an axle housing affixed perpendicular to its long axis midway along the parallel length. Transformation into a game cart occurs when (1) the strap is removed, (2) the inner half pipe is slid forward toward the leading part of the cart (defined as the end of the cart with a handle indicating the direction being pulled) and (3) the outer half pipe is removed from it's mating channel in the base half pipe turned 180 degrees and slid into the open hem (formed by hemming of the base half pipes straight edges) of the base half pipe at the rear end. (4) The handle extensions are moved forward affixed and (5) the handle is removed from the axle housing and (6) inserted into the handle extensions and secured. (7) The axle is placed into the axle housing and (8) the two wheels affixed. When used for wheeling gear into the field, the strap is loosened and steps 5,6,7 and 8 are performed. The strap is then re-tightened.

Embodiment II uses two half pipes of which the base half pipe has an axle housing affixed perpendicular to its long axis near the top (closest to the seat cover) along it's parallel length. The base half pipe and the outer half pipe are rotatably affixed together at their upper outside edges to form the cylinder. A channel is provided along both straight sides of the base half pipe to accept the outer half pipe when in a cylinder orientation. Transformation into a game cart occurs when (1) the strap is removed, (2) the handle and handle extensions are removed from the axle housing and (3) the outer half pipe is rotated about it's pivot 180 degrees and comes to rest against the axle housing forming a trough. (4) The handle extensions are fitted through the handle extension brackets and the axle housing, secured with strap and ratchet wheel and (5) the handle is inserted into the handle extensions and secured. (6) The axle is placed in the axle housing and (7) the two wheels are installed. When used as a container for wheeling gear into the field, the strap is loosened. The handle is removed from the axle housing, inserted and secured in the handle extensions. The axle and wheels are installed and the strap and ratchet wheel secures the handle extension in the axle housing and the half pipes in the cylinder orientation.

BRIEF DESCRIPTION OF THE DRAWING

Multi-Functional Hunter's Accessory

IDENTIFICATION BY NUMBER

Multi-Functional Hunter's Accessory

Multi-functional hunter's accessory will be abbreviated "M-fha"

| | |
|---|---|
| 10 | M-fha embodiment I |
| 11 | Base half pipe em I |
| 13 | Axle housing em I & II |
| 14 | Axle em I & II |
| 15 | Wheels em I & II |
| 16 | Inner half pipe em I |
| 17 | Outer half pipe em I |
| 18 | Handle extension em I |
| 19 | Handle em I |
| 20 | Seat em I & II |
| 21 | Bottom end cap em I & II |
| 22 | Strap with ratchet wheel em I & II |
| 23 | Centering pin em I |
| 24 | Hitch pins em I & II |
| 25 | Commode seat em I & II |
| 29 | Handle extension bracket em I & II |
| 31 | Back pack straps em I & II |
| 40 | M-fha embodiment II |
| 41 | Base half pipe em II |
| 43 | Outer half pipe em II |
| 44 | Handle extension em II |
| 45 | Handle em II |
| 46 | Pivot bolt em II |

DETAILED DESCRIPTION OF THE INVENTION

Figure 1:
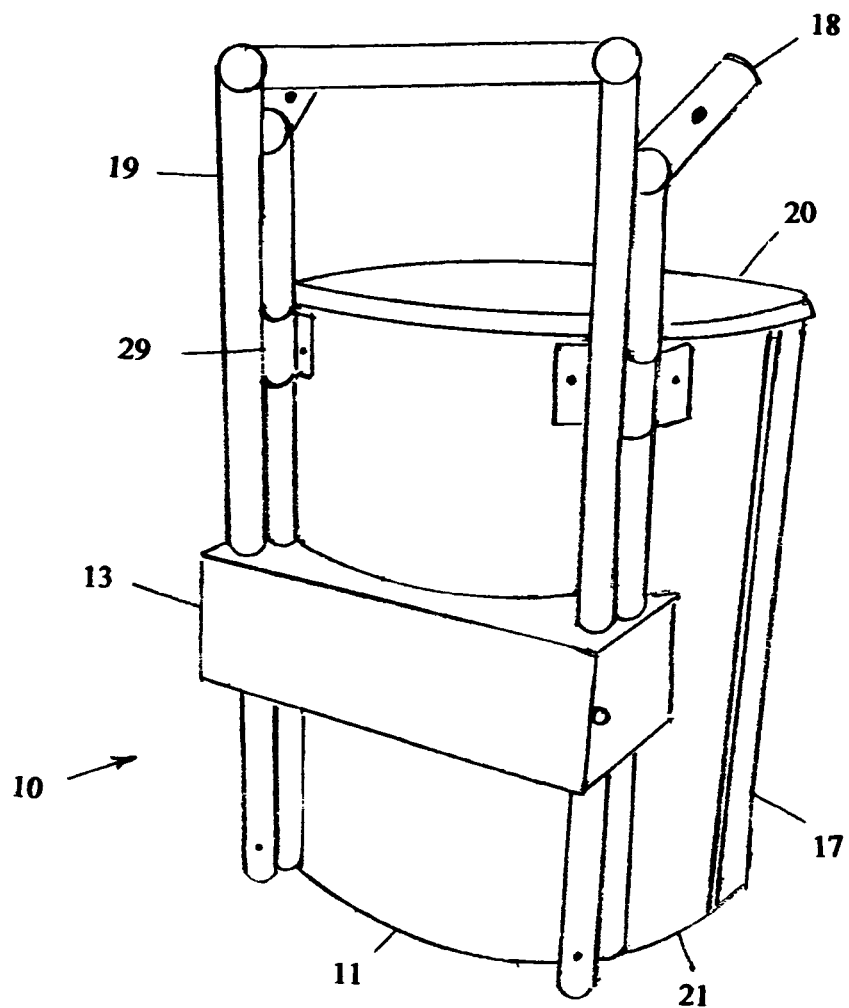
FIG. 1 is a perspective view of the exemplary multi-functional hunter's accessory in the chair mode in accordance with embodiment I of the present invention.
Figure 2:
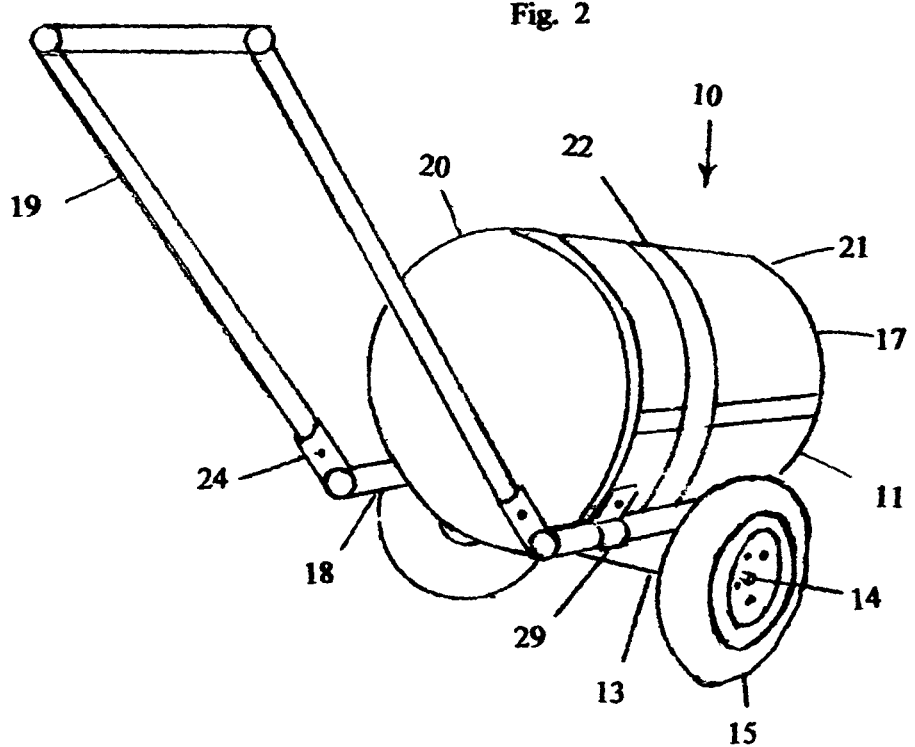
FIG. 2 is a perspective view of the exemplary multi-functional hunter's accessory in the role as a wheeling transport device for hunting gear in accordance with embodiment I of the present invention.
Figure 7:
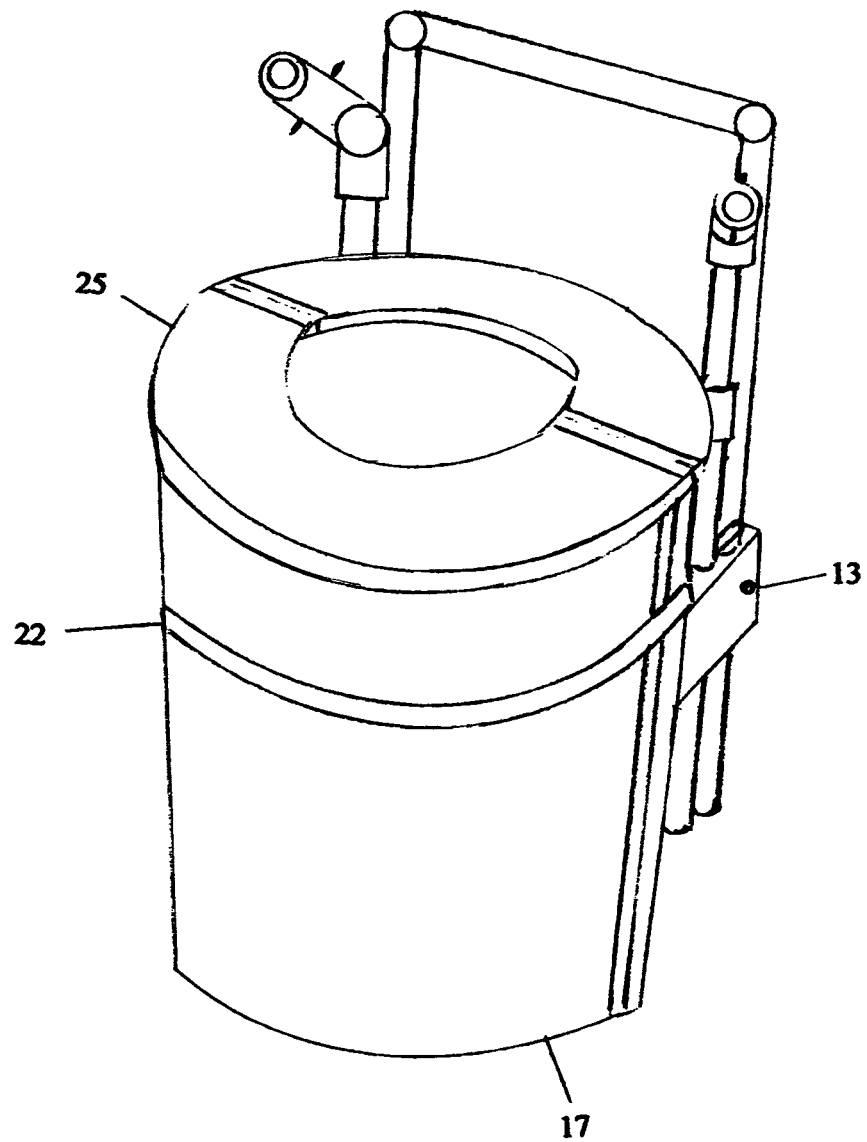
FIG. 7 is a perspective view of exemplary multi-functional hunter's accessory with commode seat in place in accordance with embodiment I of the present invention.

An exemplary multi-functional hunter's accessory 10 (embodiment I) in accordance with the present invention will now be described in detail with reference to FIGS. 1-7 and 12. The multi-functional hunter's accessory 10 in the cylinder position FIG. 1 provides a chair with adjustable back support and storage that allows for the organization and transport of gear. This is done with light weight materials that allows the multi-functional hunter's accessory 10 to be carried like a pail or back packed FIG. 5 into the hunt area. The hunter who wishes to wheel his gear to the hunt site can remove the seat 20 to expose two wheels 15, an axle 14, a commode seat 25. By removing the axle 14, installing it through the axle housing 13 and securing the wheels 15 onto the axle 14, the container can be filled with gear. After filling with gear and the seat 20 replaced, the strap and ratchet wheel 22 is loosened FIG. 12 and the handle 19 removed from it's storage location in the axle housing 13 then placed into the handle extensions 18 and secured with hitch pins 24. The strap and ratchet wheel 22 is re-tightened and the multi-functional hunter's accessory 10 is ready to wheel to the hunt site. FIG. 2 When the need for the commode arises, the seat 20 is removed, the commode seat 25 opens and replaces the seat 20. The handle 19 is removed by pulling the hitch pins 24 and placed back in the axle housing 13. FIG. 7.

Figure 3:
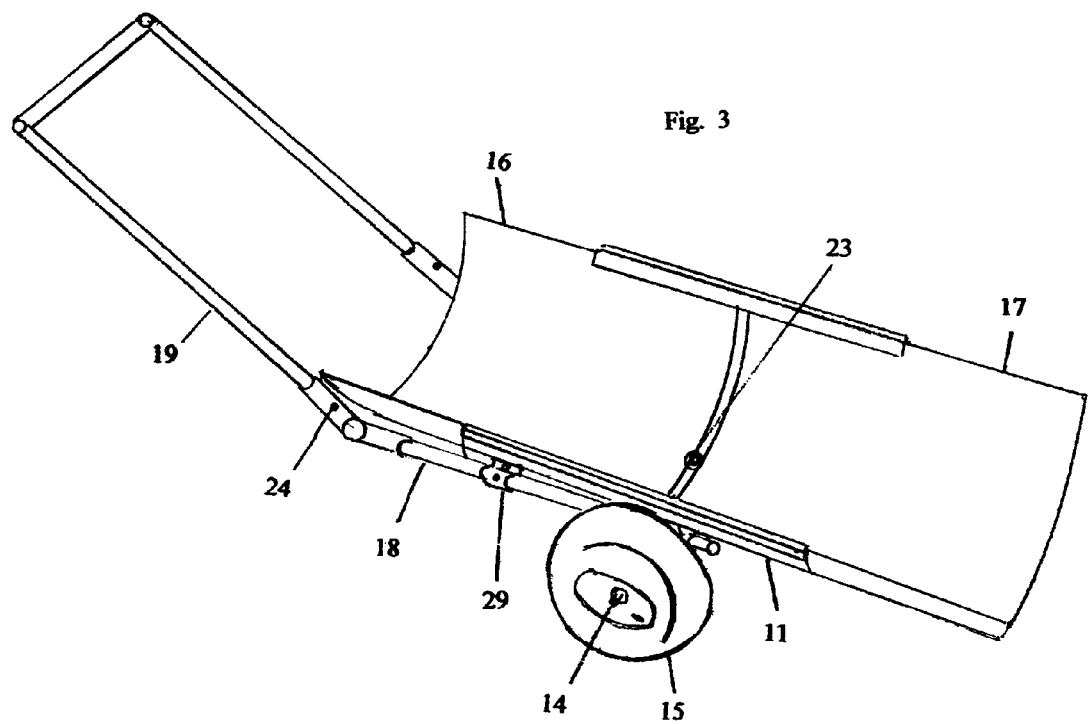
FIG. 3 is a perspective view of the exemplary multi-functional hunter's accessory assembled as a game cart in accordance with embodiment I of the present invention.
Figure 4:
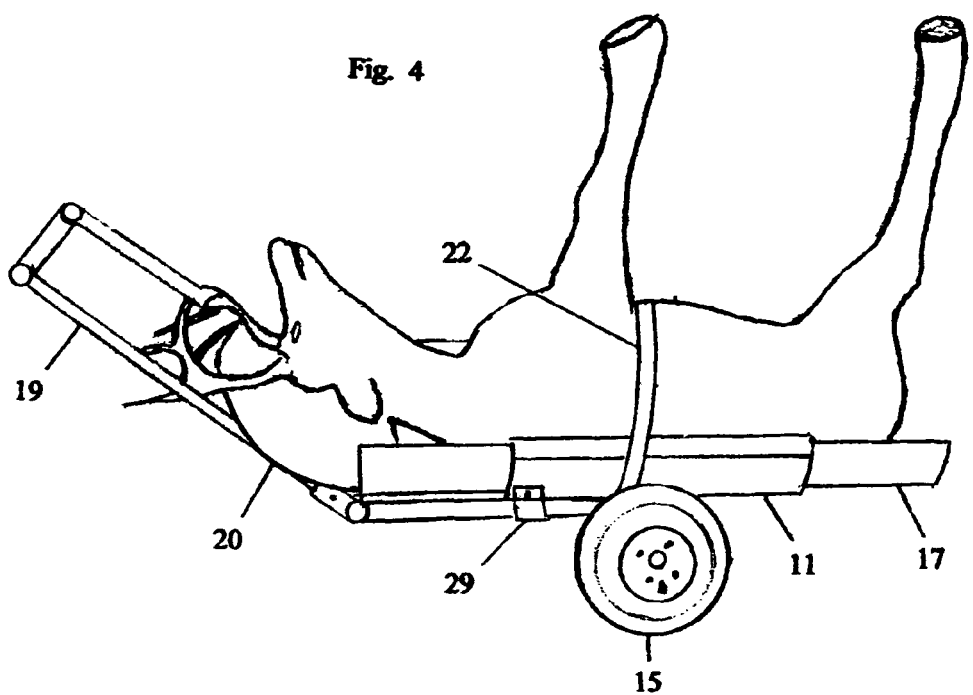
FIG. 4 is a side view of the exemplary multi-functional hunter's accessory with game carcass secured in accordance with embodiment I of the present invention.
Figure 5:
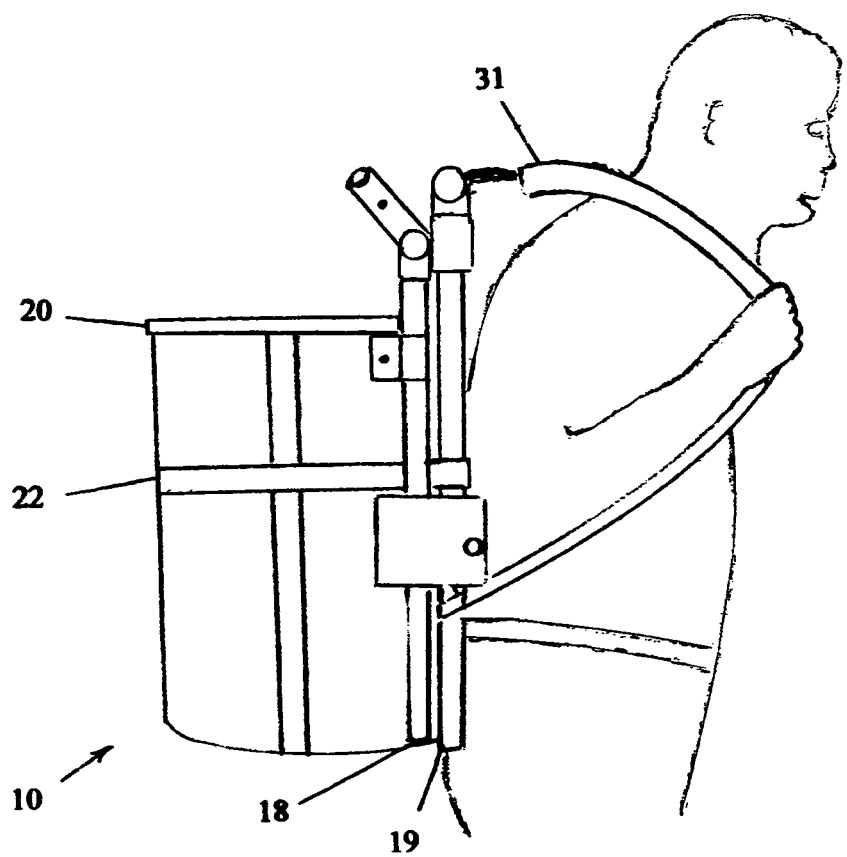
FIG. 5 is a side view of the exemplary multi-functional hunter's accessory in the back pack position in accordance with embodiment I of the present invention.
Figure 6:
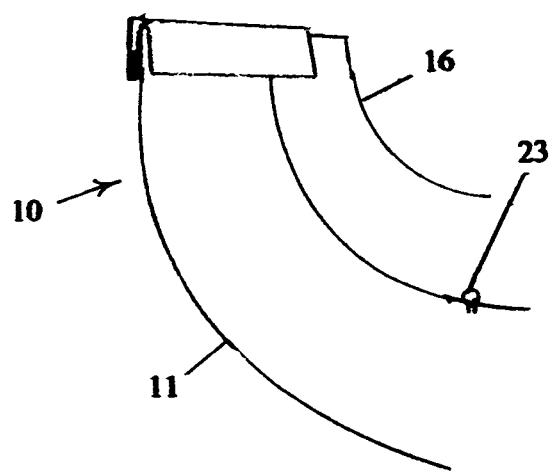
FIG. 6 is a perspective view of exemplary multi-functional hunter's accessory portraying the open hem and channel located along the parallel edges of the base half pipe in accordance with embodiment I of the present invention.

When transformation to a game cart is required, the seat 20 is removed, the gear, wheels 15, axle 14, commode seat 25 and the bottom end cap 21 are removed. The strap 22 is loosened and removed allowing removal of the handle 19 and the sliding forward of the handle extensions 18. The handle extensions are fixed in place with hitch pins 24 at the handle extension brackets 29. The handle 19 is affixed in the handle extensions 18 with hitch pins 24. The outer half pipe 17 is removed from it's channel in the base half pipe 11. The inner half pipe 16 is slid forward (upward) half its length within the open hem FIG. 6 in the base half pipe 11. The outer half pipe 17 is rotated 180 degrees and slid into the open hem of the base half pipe's 11 lower end. A centering pin 23 is threaded into a hole in the bottom trough of the base half pipe 11 to act as a stop for the inner half pipe 16 and the outer half pipe 17. The axle 14 is installed in the axle housing 13 and the wheels 15 are affixed to the axle on each side. FIG. 3 The seat 20 is affixed to the handle 19 above the connection to the handle extensions 18 to serve as support for the game carcass's head. The strap with ratchet wheel 22 is used to secure the carcass in the game cart's trough in an inverted position. FIG. 4

Figure 8:
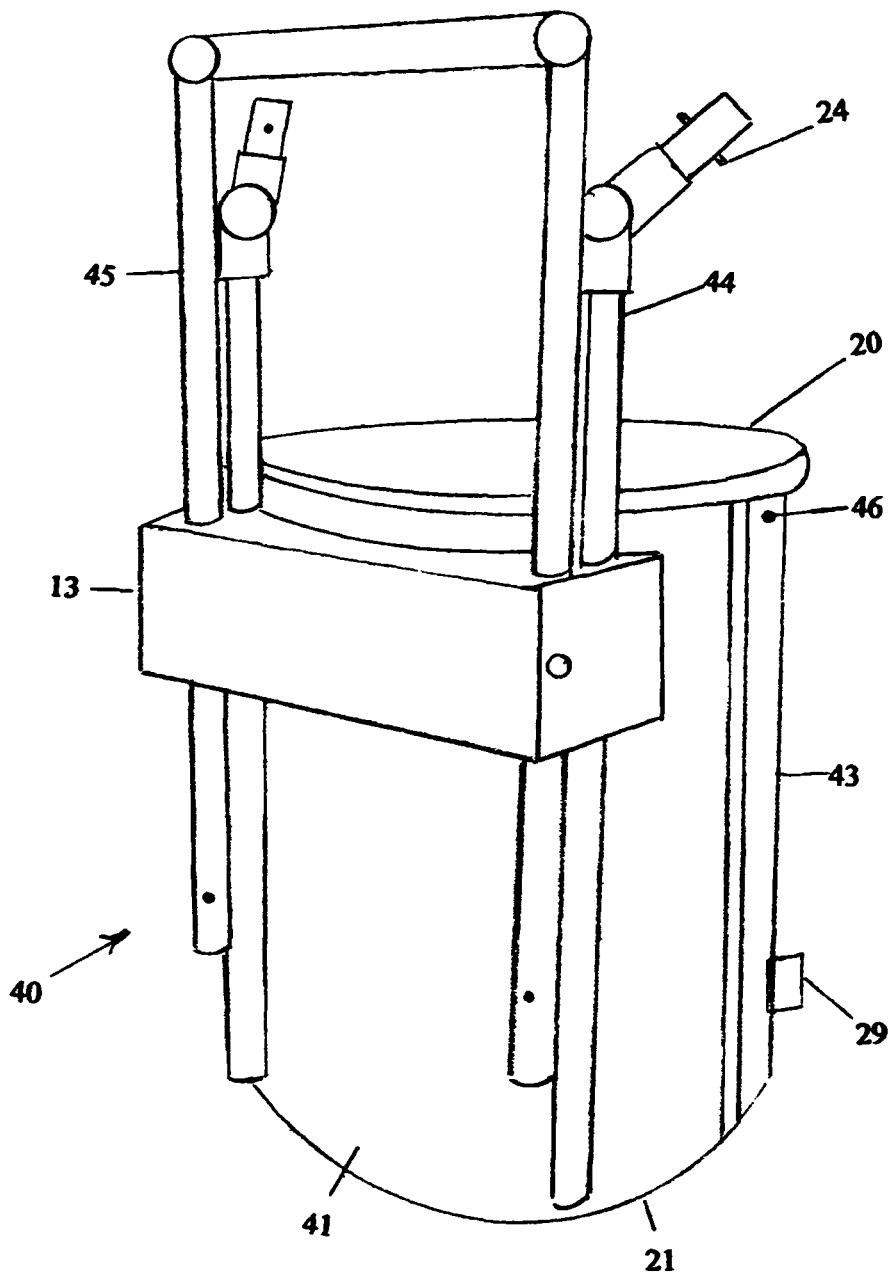
FIG. 8 is a perspective view of the exemplary multi-functional hunter's accessory in the chair mode in accordance with embodiment II of the present invention.
Figure 9:
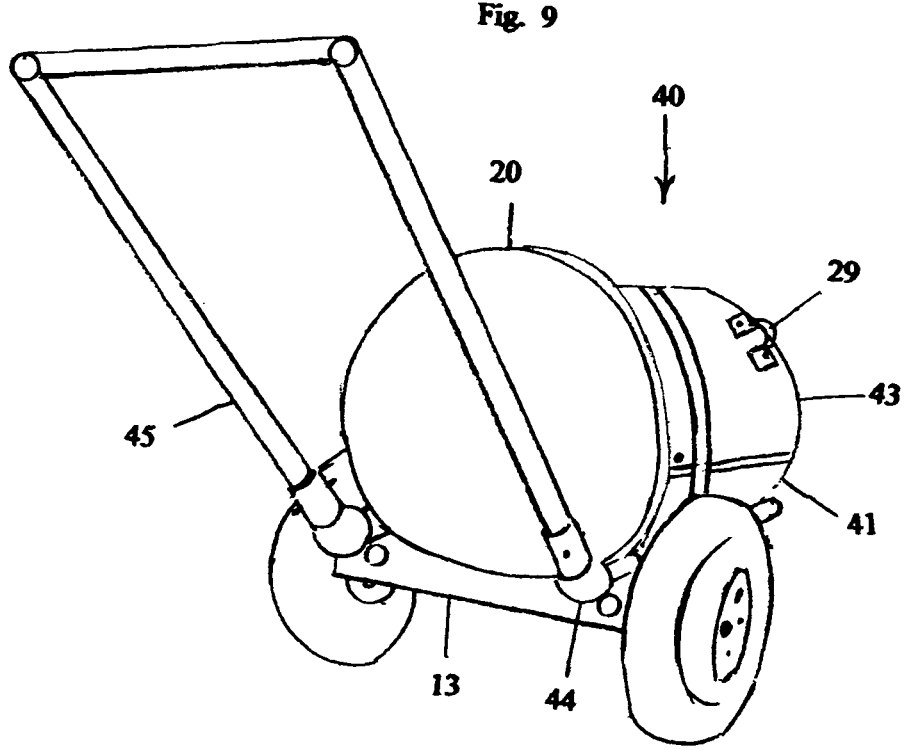
FIG. 9 is a perspective view of the exemplary multi-functional hunter's accessory in the role as a wheeling transport device for hunting gear in accordance with embodiment II of the present invention.

An exemplary multi-functional hunter's accessory 40 (embodiment II) with the present invention will now be described in detail with reference to FIGS. 8-11. The multi-functional hunter's accessory 40 in the cylinder position FIG. 8 provides a chair with adjustable back support and a storage that allows for organization and transport of gear. This is done with light weight material that allows the multi-functional hunter's accessory 40 to be carried like a pail or back packed into the hunt area. The hunter who wishes to wheel his gear to the hunt site can remove seat 20 to expose two wheels 15, an axle 14 and commode lid 25. Removing the axle 14, installing it through the axle housing 13 and affixing the wheels 15 is followed by the strap and ratchet wheel 22 being loosened and the handle 45 removed from it storage location in the axle housing 13. It is secured in the handle extensions 44 with hitch pins 24 and the strap 22 is then re-tightened. After the gear is stored and the seat 20 replaced, the hunter can wheel his gear to the hunt site. FIG. 9

Figure 10:
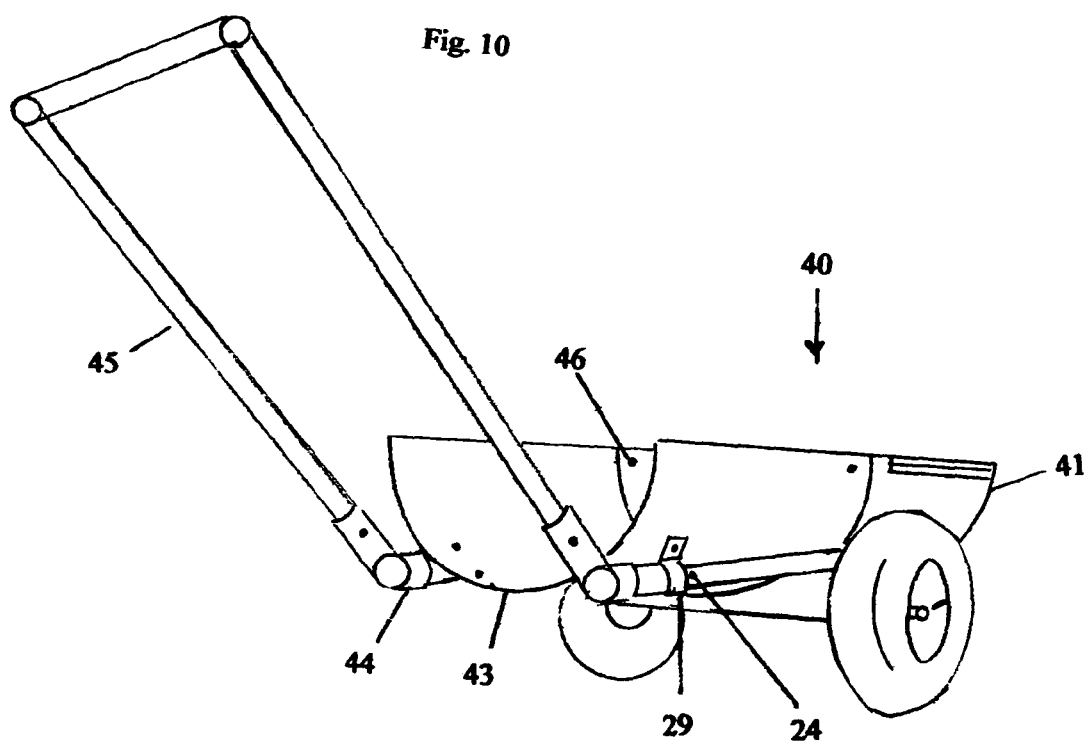
FIG. 10 is a perspective view of the exemplary multi-functional hunter's accessory assembled as a game cart in accordance with embodiment II of the present invention.
Figure 11:
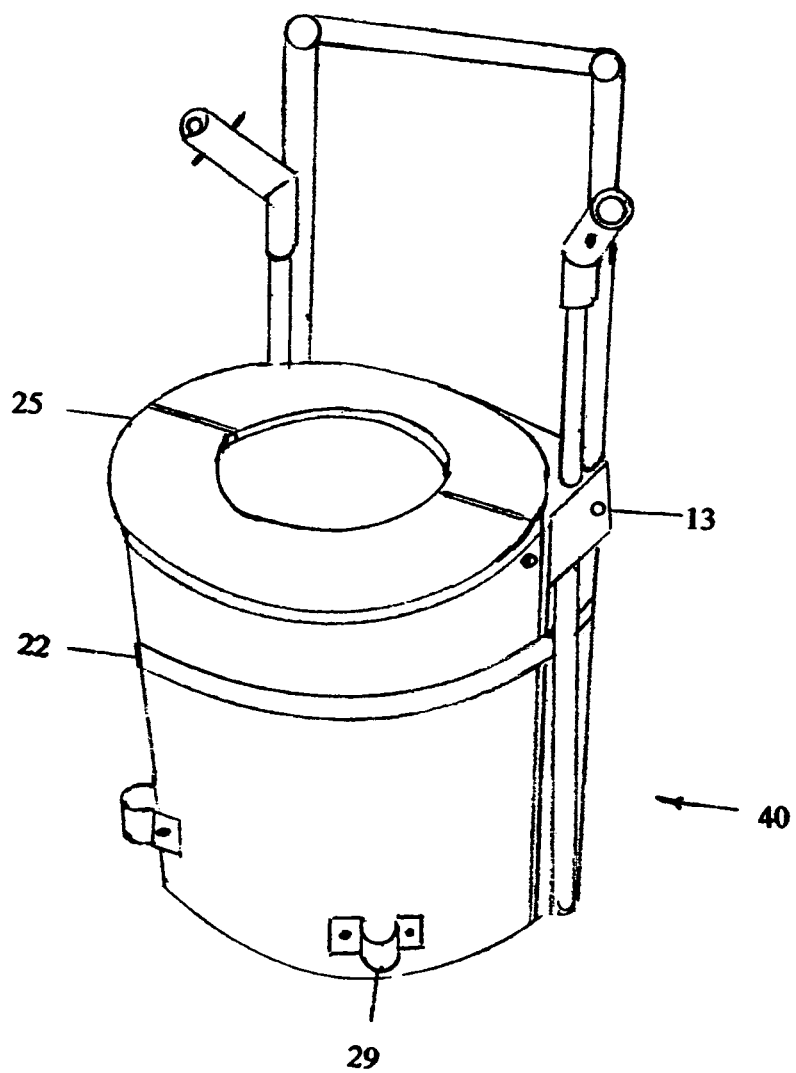
FIG. 11 is a perspective view of exemplary multi-functional hunter's accessory with commode seat in place in accordance with embodiment II of the present invention.
Figure 12:
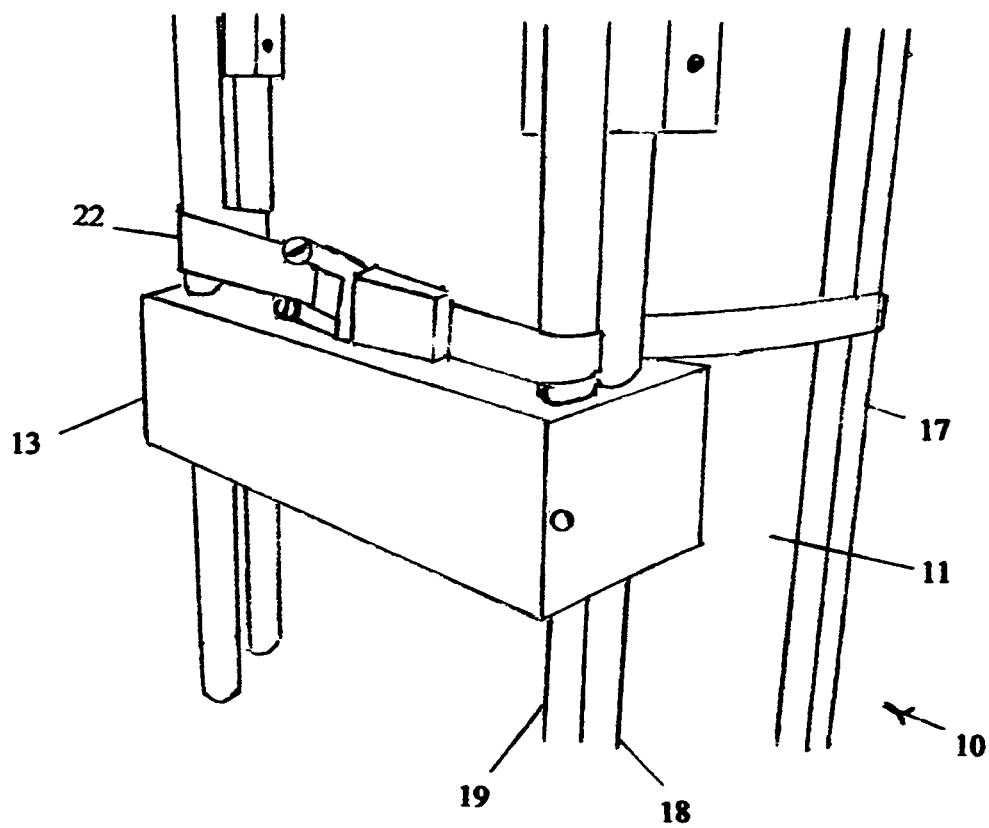
FIG. 12 is a perspective view of exemplary multi-functional hunter's accessory with strap and ratchet in place securing the handle and handle extensions in the axle housing and the outer half pipe within it's channel in the base half pipe with embodiment I of the present invention.

When transformation to a game cart is required, the seat 20 is removed and the gear, axle 14, wheels 15, commode seat 25 are emptied out. The bottom end cap 21 is removed and the strap 22 loosened and removed. The handle 45 and handle extensions 44 are removed from their storage location in the axle housing 13. The outer half pipe 43 is rotated 180 degrees about the pivot 46 until the circumference comes to rest against the axle housing 13. The handle extensions 44 are fitted through the handle extension brackets 29 and the axle housing 13 and secured to the handle extension brackets 29 with hitch pins 24. The handle 45 is inserted into the handle extensions 44 and secured with hitch pins 24. FIG. 10. When loading the game cart, the seat cover 20 is affixed to the base of the handle 45 above it's connection to the handle extensions 44 to support the game carcass's head and the strap 22 is tightened about the carcass to keep it in the trough.

Materials of construction for the parts of multi-functional hunter's accessory embodiment I and II must be light in weight in order for transport into the field to require minimum effort. The half pipes 11,16,17 and 43 can be made of aluminum or a composite like fiberglass. Because of the strength made possible by the interlocking half pipes in multi-functional hunter's accessory embodiment I, metal would be the preferred choice. The half pipes in embodiment II could function as metal or a composite. The axle housing 13 would ideally be constructed of a metal like aluminum. Handles 19 and 45 and handle extension 18 and 44 can be constructed of aluminum tubing, fiberglass or hardwood such as hickory.

Attachments of parts like the axle housing 13 to base half pipe 11 or 41 is accomplished with welding when aluminum is used. It provides a rigid connection that is light and strong.

Attachment of the handle extension brackets 29 can be done with bolts and locking nuts, rivets or welding.

Wheels 15 of choice are of the wide pneumatic type with inner and outer bearings to allow smooth rolling over rugged and swampy terrain. With a wheel diameter slightly over half of that of the container and located well outboard of the trough that is created, the game cart has a low center of gravity and very stable ride. Additionally the wheels may be replaced by other ground contacting structures for moving the game cart across various terrain, such as a skid or other structures for sliding across the ground.

The size of multi-functional hunter's accessory embodiment I & II in the figures provided suggests a container of about 12 gallons in volume. This provides a suitable height for sitting when that feature is used. It also allows for a great deal of gear storage in addition to the wheels. 15 and axle 14 The trough provided when either embodiment is in the game cart orientation is long enough and broad enough for all but the largest deer-like animals. While impractical as a chair or commode, a much larger embodiment of multi-functional hunter's accessory embodiment II could be envisioned with capacity of 55 gallons or more. Outfitted with an appropriate size axle housing 13, axle 14 and wheels 15, it could be used to store and transport duck decoys or other items requiring this volume.

Balance front to rear is about 50/50 for multi-functional hunter's accessory embodiment I 10 due to the axle housing 13 being centered on the base half pipe. Multi-functional hunter's accessory embodiment II 40 has about a 60/40 front to rear balance ratio since the axle housing 13 is slightly to the rear of center when in the game cart orientation The color of both embodiments would be non-reflective. Ideally a camouflage pattern would be applied to avoid spooking wildlife as the hunter moves it through the woods.

The handles 19 and 45 are provided large enough for two hunters to pull against when required. They can be tubing bent to the shape shown or solid lengths of material joined to form the U shape with commercial elbows and angles used in plumbing.

What is claimed is:

1. A multi-functional hunter's accessory transformable between, a chair with storage, a commode and a cart for transporting a game carcass, the multi-functional hunter's accessory comprising: a cylinder formed by half pipes configurable to form a chair or commode when a seat and backrest is applied or a trough for holding a game carcass; a removable lid forming a seat on the cylinder; a handle forming a backrest for the chair and providing a means for towing the cart; ground engaging wheels with pneumatic tires that affix to the trough with an axle through an axle housing; handle extensions providing connection points for a handle; a bottom cap to secure items; a strap with ratchet wheel which secures the handle and handle extensions in place while holding the half pipes in a cylinder or trough orientation and serves to secure a game carcass.

2. The multi-functional hunter's accessory of claim 1, wherein the embodiment is composed of $1^{st}$, $2^{nd}$ and $3^{rd}$ half pipes forming the cylinder shape that becomes the chair; the $1^{st}$ and $2^{nd}$ half pipes assemble within the $3^{rd}$ half pipe to form a trough in which the game carcass is laid.

3. The multi-functional hunter's accessory of claim 1, wherein the $1^{st}$ and $2^{nd}$ half pipes are rotatably joined to form the cylinder shape which becomes the chair wherein the $1^{st}$ half pipe rotates about its pivot to adjoin the $2^{nd}$ half pipe and form the trough into which the game carcass is laid.

* * * * *